(12) United States Patent
Stickelmaier et al.

(10) Patent No.: US 9,989,041 B2
(45) Date of Patent: *Jun. 5, 2018

(54) THRUSTER GRID CLEAR CIRCUITS AND METHODS TO CLEAR THRUSTER GRIDS

(71) Applicant: The Boeing Company, Chicago, IL (US)

(72) Inventors: John F. Stickelmaier, Manhattan Beach, CA (US); Philip D. Nguyen, Seal Beach, CA (US)

(73) Assignee: The Boeing Company, Chicago, IL (US)

( * ) Notice: Subject to any disclaimer, the term of this patent is extended or adjusted under 35 U.S.C. 154(b) by 404 days.

This patent is subject to a terminal disclaimer.

(21) Appl. No.: 14/693,482

(22) Filed: Apr. 22, 2015

(65) Prior Publication Data
US 2015/0226189 A1    Aug. 13, 2015

Related U.S. Application Data

(63) Continuation of application No. 13/655,138, filed on Oct. 18, 2012, now Pat. No. 9,038,364.

(51) Int. Cl.
*F03H 1/00* (2006.01)
*B64G 1/40* (2006.01)

(52) U.S. Cl.
CPC ........... *F03H 1/0043* (2013.01); *B64G 1/405* (2013.01)

(58) Field of Classification Search
CPC .... F03H 1/0018; F03H 1/0037; F03H 1/0043; B64G 1/42; B64G 1/405
See application file for complete search history.

(56) References Cited

U.S. PATENT DOCUMENTS

| 6,507,142 | B1 | 1/2003 | Tilley et al. | |
| 6,617,549 | B2* | 9/2003 | Ihde | B23K 9/0956 |
| | | | | 219/130.21 |
| 6,786,035 | B2 | 9/2004 | Stickelmaier | |
| 7,306,189 | B2 | 12/2007 | Dressler | |
| 2004/0011022 | A1 | 1/2004 | Stickelmaier | |
| 2014/0109549 | A1 | 4/2014 | Stickelmaier et al. | |

FOREIGN PATENT DOCUMENTS

| CN | 101381005 | 3/2009 |
| CN | 102439305 | 5/2012 |

OTHER PUBLICATIONS

Anderson "Experimental and Theoretical Analysis for Designing a Grid Clearing System for the NEXT Ion Propulsion System" 2005.*

(Continued)

*Primary Examiner* — William H Rodriguez
*Assistant Examiner* — William Breazeal
(74) *Attorney, Agent, or Firm* — Hanley, Flight and Zimmerman, LLC

(57) ABSTRACT

Thruster grid clear circuits and methods to clear thruster grids are disclosed. An example apparatus includes a low voltage grid clear circuit to apply first energy to a grid at a first voltage, and a high voltage grid clear circuit to detect a failure of the applied energy to clear a short circuit condition of the grid and to apply second energy to the grid at a second voltage higher than the first voltage.

17 Claims, 5 Drawing Sheets

(56) References Cited

OTHER PUBLICATIONS

Anderson et al., "Experimental and Theoretical Analysis for Designing a Grid Clearing System for the NEXT Ion Propulsion System," 41st AIAA/ASME/SAE/ASEE Joint Propulsion Conference and Exhibit, Tuscon, Arizona, Jul. 10-13, 2005, 17 pages.

State Intellectual Property Office of the People's Republic of China, English version of "Notification of First Office Action," issued in connection with Chinese Patent Application No. 201310491625.8, dated Aug. 2, 2016, 17 pages.

European Patent Office, "Extended European Search Report," issued in connection with European Patent Application No. 13187409.1, dated Feb. 25, 2016 (7 pages).

Anderson et al, "Experimental and Theoretical Analysis for Designing a Grid Clearing System for the Next Ion Propulsion System," 41st AIAA/ASME/SAE/ASEE Joint Propulsion Conference & Exhibit, Tucson, Arizona, Jul. 10-13, 2005, Abstract Only, (3 pages).

United States Patent and Trademark Office, "Notice of Allowance," issued in connection with U.S. Appl. No. 13/655,138, dated Jan. 21, 2015, 44 pages.

* cited by examiner

THRUSTER GRID CLEAR CIRCUITS AND METHODS TO CLEAR THRUSTER GRIDS

RELATED APPLICATIONS

This patent arises from a continuation of U.S. patent application Ser. No. 13/655,138, filed Oct. 18, 2012. The entirety of U.S. patent application Ser. No. 13/655,138 is incorporated herein by reference.

BACKGROUND

Ion thrusters are currently used for spacecraft control on some communications satellites. Some existing systems operate by ionizing xenon gas and accelerating it across two or three charged molybdenum grids. As the ions pass through these grids, small amounts of molybdenum are sputtered off to deposit on the downstream grids. Over time, these deposits can grow large enough to flake off and cause a short circuit between the grids, shutting down the thruster. When this occurs, the thruster must be turned off so that the grids can be cleared to remove the short circuit. Grid clear circuitry is employed to apply energy through the short, causing the material to be burned off.

FIG. 1 is a schematic diagram of a contaminated ion propulsion grid within an ion thruster. When the thruster is operating, ionized gas 102 is accelerated across two or more charged grids 104. However, deposits can accumulate on the grids 104 to a point where a short circuit 106 is created, which reduces or eliminates the effectiveness of the thruster.

Prior art grid clear circuits employ a dropping resistor 110 coupled to a voltage source 108 (e.g., the spacecraft bus voltage) to clear the grids 104. The voltage source 108 is applied (through the dropping resistor 110) to the shorted grids 104. However, there is still a need for other grid clearing processes and circuitry that would provide improvements over prior art systems and provide additional benefits or advantages (e.g., reduce operating or maintenance costs, increase thruster service life, increase grid service life, reduce energy requirements, for example, for clearing a grid, but still effectively reduce or remove contamination on grid surfaces or grid systems.

SUMMARY

A disclosed example apparatus includes a low voltage grid clear circuit to apply first energy to a grid at a first voltage, and a high voltage grid clear circuit to apply second energy to the grid at a second voltage higher than the first voltage.

A disclosed example method includes detecting a first grid clear process comprising application of a first voltage to a grid, and applying a second grid clear process having a second voltage higher than the first voltage to the grid.

A disclosed ion propulsion system includes a first thruster grid, a second thruster grid coupled to a reference voltage, a low voltage grid clear circuit to clear a short circuit condition between the first and second thruster grids by applying first energy at a first voltage, and a high voltage grid clear circuit to detect a failure of the first energy to clear the short circuit condition and to apply second energy to the grid at a second voltage higher than the first voltage in response to the detection.

The features, functions, and advantages that have been discussed can be achieved independently in various embodiments or may be combined in yet other embodiments, further details of which can be seen with reference to the following description and drawings.

DETAILED DESCRIPTION

Figure 1:
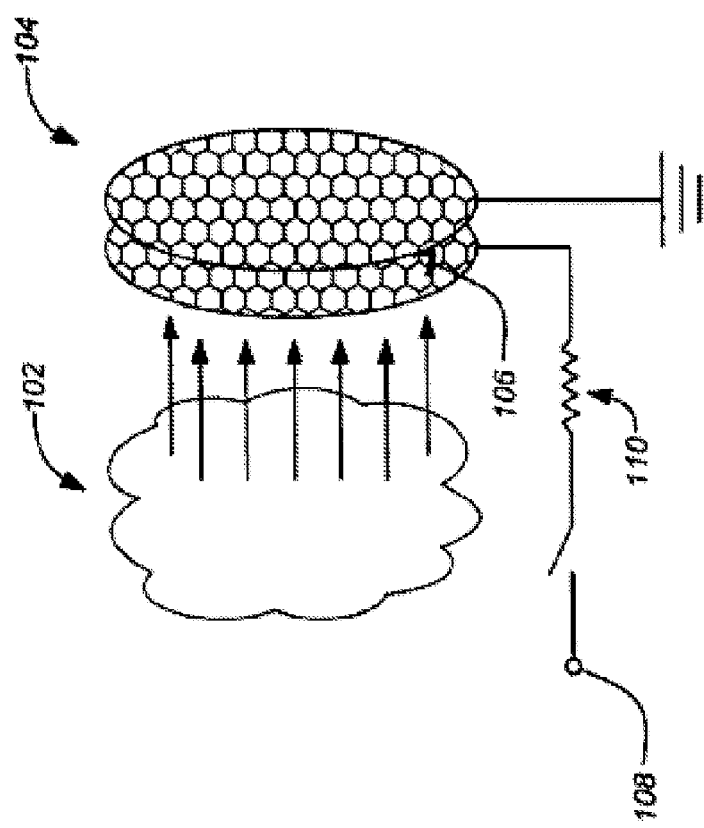
FIG. 1 is a schematic diagram of a contaminated ion propulsion grid within an ion thruster.

Example ion propulsion systems, thruster grid clear circuits, and methods to clear thruster grids are disclosed below. In contrast to present grid clear circuits, the example ion propulsion systems, thruster grid clear circuits, and methods to clear thruster grids are able to clear a wider variety of short circuit conditions caused by deposits on thruster grids. For example, some types of short circuit conditions appear at relatively high voltages but do not appear at lower voltages that have been used in the past to clear such short circuit conditions.

In some examples, an ion propulsion system includes a low-voltage grid clear circuit and a high-voltage grid clear circuit. The example low-voltage grid clear circuit is capable of applying higher electrical currents at lower voltages (e.g., 100V) to remove deposits that cause short circuits in a thruster grid. The high-voltage grid clear circuit applies a high-voltage signal to initiate an arc, which enables the low-voltage grid clear circuit to apply a higher current to clear the deposits. In some examples, the high-voltage grid clear circuit monitors the low-voltage grid clear circuit to determine whether the low-voltage grid clear process is effective at clearing (e.g., eliminating) the short circuit condition. If the high-voltage grid clear circuit determines that the low-voltage grid clear process does not clear the short circuit condition, the high-voltage grid clear circuit applies a high-voltage grid clear process to the thruster grid.

In some examples, the high-voltage grid clear process includes applying a substantially higher voltage (e.g., 1000V) to the thruster grid. The high-voltage grid clear process may cause an arc to occur between a first grid electrically coupled to the low-voltage grid clear circuit and a second grid electrically coupled to a reference voltage. In some examples, the induced arc between the grids occurs between deposits located on the respective grids. The induced arc creates a low-resistance plasma path between the first and second grids (e.g., between the deposits). The low-resistance path enables the low-voltage grid clear process to direct higher currents through the deposits, thereby enabling the low-voltage grid clear circuit to clear the deposits (e.g., clear the short circuit condition).

In some examples, any pair of adjacent thruster grids in an ion propulsion thruster may be cleared of a short-circuit condition using the low-voltage grid clear process and the high-voltage grid clear process. In an example, an ion propulsion thruster includes three thruster grids, in which a center one of the grids is located between and, thus, is adjacent the other two grids. Short circuits occurring between the center grid and a first one of the outside grids may be cleared by applying the low voltage grid clear process (e.g., via a low-voltage grid clear circuit) and the high voltage grid clear process (e.g., via a high-voltage grid clear circuit) to the center grid while the first outside grid is connected to a reference and/or by applying the low voltage grid clear process and the high voltage grid clear process to the first outside grid while the center grid is connected to a reference.

Similarly, short circuits between the center grid and a second one of the outside grids may be cleared by applying the low voltage grid clear process and the high voltage grid clear process to the center grid while the second outside grid is connected to a reference and/or by applying the low voltage grid clear process and the high voltage grid clear process to the second outside grid while the center grid is connected to a reference.

In some examples, short circuits between both the center grid and the first outside grid, and the center grid and the second outside grid, can be cleared by applying the low voltage grid clear process and the high voltage grid clear process to the center grid while the outside grids are connected to a reference and/or by applying the low voltage grid clear process and the high voltage grid clear process to the outside grids while the center grid is connected to a reference.

Figure 2:
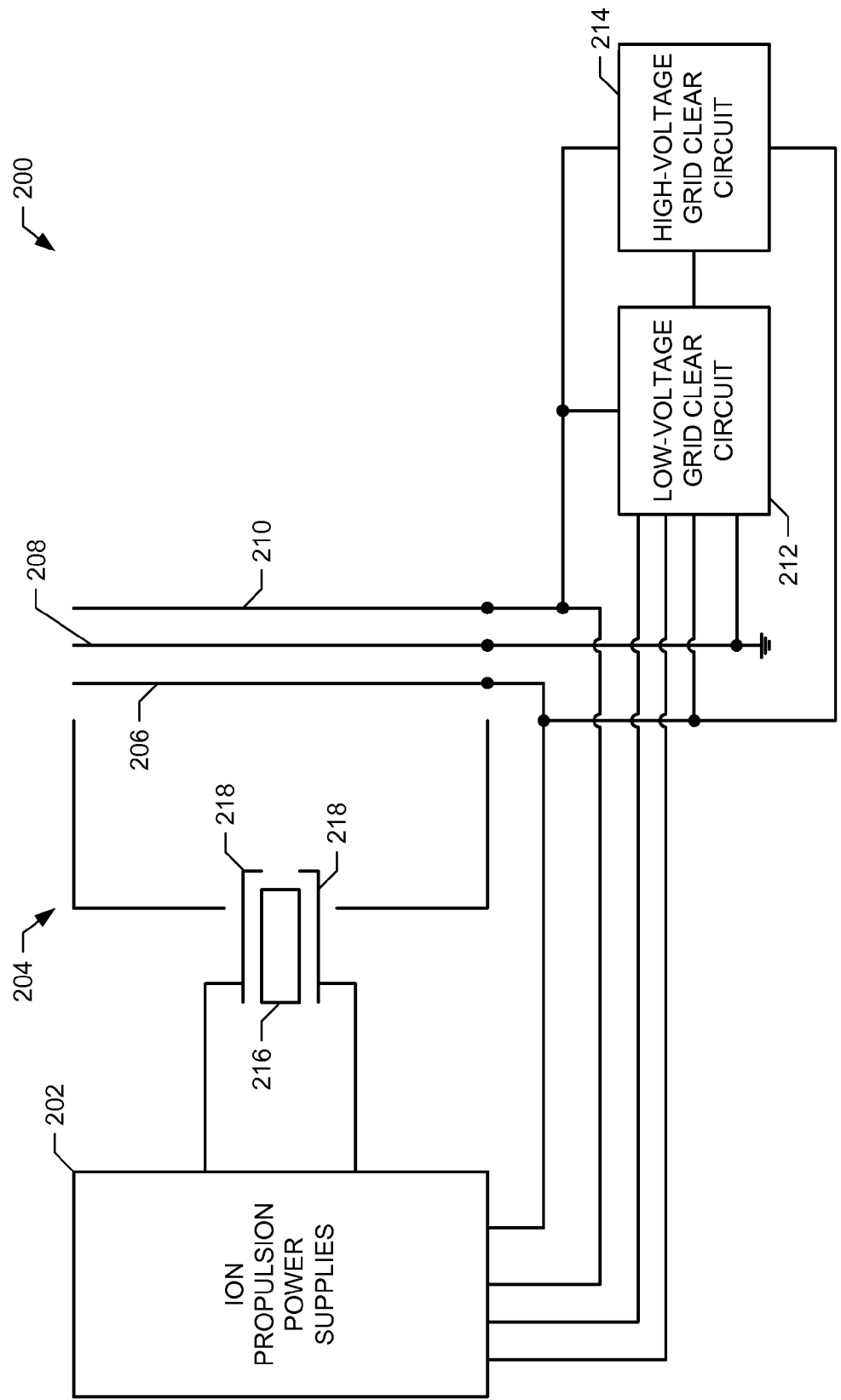
FIG. 2 is a block diagram of an example ion propulsion system including grid clear circuits.

FIG. 2 is a block diagram of an example ion propulsion system 200 including grid clear circuits. The example ion propulsion system 200 of FIG. 2 may be used to provide propulsion for a platform such as a spacecraft. The ion propulsion system 200 of FIG. 2 includes power supplies 202, a thruster 204, thruster grids 206, 208, 210, a low-voltage grid clear circuit 212, and a high-voltage grid clear circuit 214.

The example power supplies 202 provide electrical energy to the thruster 204 and the thruster grids 206-210 to enable the thruster 204 to provide thrust. The example power supplies 202 may provide electrical energy at multiple voltages and/or currents to fulfill specific needs of the thruster 204 and/or the grids 206-210.

The example thruster 204 includes propellant 216 and electrodes 218. The propellant 216 is transformed into ions by generation of electrons by the electrodes 218. The example thruster grids 206-210 are electrically charged to accelerate the resulting ions to produce thrust. The example grid 206 is a screen grid, the example grid 208 is an acceleration grid, and the example grid 210 is a deceleration grid. In some examples, the deceleration grid 210 is omitted. In some other examples, additional grids are included. Over time, material deposits may build between adjacent ones of the grids 206-210. Eventually, these deposits can reduce the distance between adjacent ones of the grids 206, 208 and 208, 210 such that the high voltages between the adjacent grids 206, 208 or 208, 210 bridges the gap(s) and results in a short circuit, which reduces the effectiveness of the thruster 204 or renders the thruster 204 inoperable.

When the power supplies 202 detect a short circuit, the power supplies 202 (or another controller) signals the low-voltage grid clear circuit 212 to attempt to clear the short circuit condition. The example low-voltage grid clear circuit 212 applies a low-voltage, high-current (e.g., 100 V) electrical signal to the outer grids 206, 210. The example high-voltage grid clear circuit 214 applies a high-voltage grid clear process to the outer grids 206, 210. When a gap between adjacent grids 206, 208 and 208, 210 causes short circuits at high voltages but cannot be cleared via the low-voltage grid clear process, the high-voltage grid clear circuit 214 provides additional (e.g., second) energy to enable the low-voltage grid clear process to clear the short circuit condition.

In the example of FIG. 2, the high-voltage grid clear circuit 214 monitors the low-voltage grid clear circuit 212 to determine whether the short circuit condition is cleared. If the high-voltage grid clear circuit 214 determines that the low-voltage grid clear circuit 212 has failed to clear the short circuit, the example high-voltage grid clear circuit 214 applies a high-voltage electrical signal (e.g., 1000 V) to the outer grids 206, 210. The high-voltage electrical signal may be current limited to avoid damaging the grids 206-210 and/or the thruster 204. The inner grid 208 remains coupled to a reference voltage.

The high-voltage grid clear circuit 214 produces an arc over the gap between the adjacent grids 206, 208 or 208, 210. The arc creates a low-resistance plasma path between the adjacent grids 206, 208 or 208, 210, which can be traversed by the low-voltage grid clear process. As a result, the example low-voltage grid clear circuit 212 can be used in conjunction with the high-voltage grid clear circuit 214 to direct larger amounts of current through the deposits to clear them.

When the high-voltage grid clear circuit 214 detects that the low-voltage grid clear circuit 212 is directing current (e.g., to clear the deposits), the high-voltage grid clear circuit 214 stops applying the high-voltage signal. If the low-voltage grid clear process exhibits additional reductions in current flow, the example high-voltage grid clear circuit 214 is re-enabled and re-establishes the arc path. In the example of FIG. 2, the low-voltage grid clear process and, as necessary, the high-voltage grid clear process continue until a certain time has elapsed and/or until the grid clear processes have applied a threshold amount of energy to the grids 206-210.

In cases in which the deposits are successfully cleared, the example low-voltage grid clear circuit 212 and the high-voltage grid clear circuit 214 stop directing current to the grids 206-210 and the operation of the thruster 204 may be resumed. In some examples, success in clearing the deposits is not known until a restart of the thruster 204 is attempted. If the deposit is not successfully cleared, the example system 200 may initiate additional attempts at clearing the short circuit condition using the grid clear circuits 212, 214.

Figure 3:
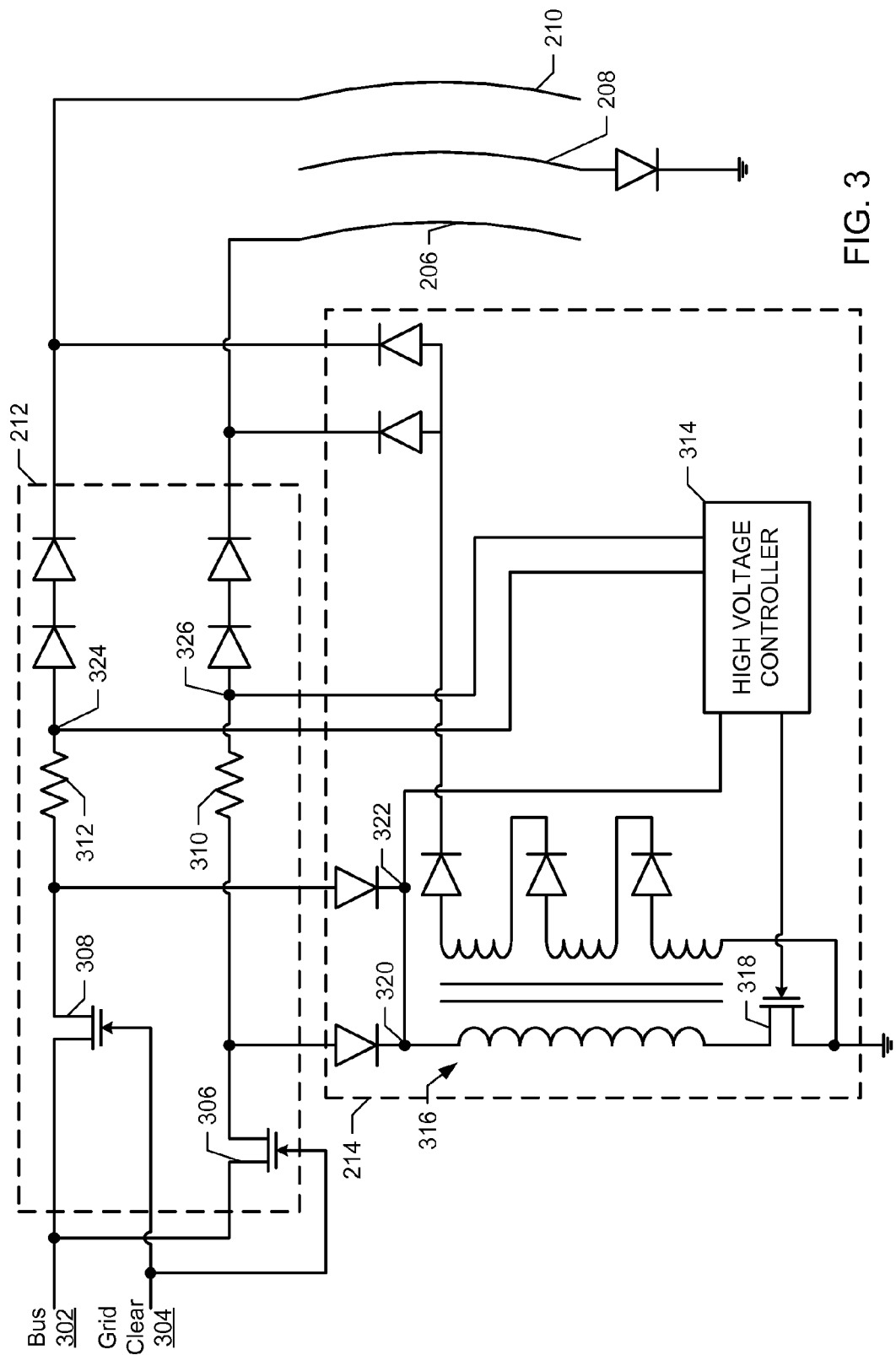
FIG. 3 is a more detailed schematic diagram of the example grid clear circuits of FIG. 2.

FIG. 3 is a more detailed schematic diagram of the example grid clear circuits 212, 214 of FIG. 2. The example low-voltage grid clear circuit 212 is coupled to an electrical bus 302 and to a grid clear signal 304 (e.g., from the power supplies 202 of FIG. 2, from a controller, or from other source(s)). The bus 302 provides electrical energy that is used by the grid clear circuits 212, 214 to apply low-voltage energy and high-voltage energy, respectively, to clear short circuit conditions in the grids 206-210.

The low-voltage grid clear circuit 212 of FIG. 3 includes switching elements 306, 308 (e.g., metal oxide semiconductor field effect transistors (MOSFETs), junction field effect transistors (JFETs), bipolar junction transistors (BJTs), electromechanical switching elements, etc.) to control the application of the electrical energy to the grids 206-210. The example switching elements 306, 308 are controlled by the grid clear signal 304. When the switching elements 306, 308 are electrically closed (i.e., conducting current), an electrical signal is applied to the outer grids 206, 210 via the bus 302. When a short circuit condition exists, current may flow from the bus 302 through the grid(s) 206, 210 and to the grid 208.

The example low-voltage grid clear circuit 212 of FIG. 3 further includes current limiting and/or current sense resistors 310, 312. When current is flowing to the grid 206 (or to the grid 210), a substantial voltage drop occurs across terminals of the resistor(s) 310 (or the resistor(s) 312). On the other hand, when the switching elements 306, 308 are closed and current is unable to flow through the grids 206-210 (e.g., because the low-voltage grid clear process is unable to bridge a gap between adjacent grids 206, 208 and 208, 210), the voltage drops over the resistors 310, 312 is relatively small or substantially equal to zero.

The example high-voltage grid clear circuit 214 of FIG. 3 includes a high voltage controller 314, a high voltage generator 316, and a switching element 318. The example high voltage controller 314 monitors the low-voltage grid clear circuit 212 to determine whether a short circuit condition exists and to determine whether the low-voltage grid clear process is effective or has failed to clear the short circuit condition. For example, the high-voltage controller 314 of FIG. 3 monitors voltages at first nodes 320, 322 (e.g., coupled to first terminals of the resistors 310, 312). When the voltages at the first nodes 320, 322 have voltages higher than a threshold, the example controller 314 determines that a short condition has occurred (e.g., because the switching elements 306, 308 have been closed).

The example high voltage controller 314 further detects whether the low-voltage grid clear process (e.g., performed by the low-voltage grid clear circuit 212) has failed to clear the short circuit condition. For example, in addition to monitoring the node voltages at the nodes 320, 322, the example high voltage controller 314 monitors node voltages at nodes 324, 326 (e.g., on the opposite ends of the resistors 310, 312 from the nodes 320, 322). If a difference in voltage across a resistor 310, 312 (e.g., between the nodes 320 and 324 or nodes 322 and 326) is greater than a threshold, the example high voltage controller 314 determines that current is being applied to the respective grid(s) 206-210. In contrast, if the difference in voltage is less than a threshold, the example high voltage controller 314 may determine that the low-voltage grid clear process cannot bridge a gap between the grids 206-210 and, thus, is failing to clear the short circuit condition.

In response to detecting a failure to clear the short circuit condition, the example high voltage controller 314 provides a signal to electrically close the switching element 318. As a result, the high voltage generator 316 generates a high-voltage signal (e.g., 1000 V) and applies the high-voltage signal to the grids 206, 210. If successful, the high-voltage signal creates an arc between the grid(s) 206, 210 and the grid 208 to provide the low-voltage grid clear circuit 212 with a low-resistance path with which to apply energy to the grids 206, 210.

When the low-voltage grid clear circuit 212 begins directing current to the grid(s) 206, 210, the voltage(s) at the node(s) 324, 326 decreases. The example high voltage controller 314 detects the reduction in voltage at the node(s) 324, 326 and electrically opens the example switching element 318 to stop applying the high voltage to the grids 206, 210. If the low-voltage grid clear circuit 212 is unable to maintain the low resistance pathway and the current flow stops, the example high voltage controller 314 again detects the increase in voltage and re-applies the high voltage to the grids 206, 210. This example process may iterate until, for example, the short circuit condition is cleared and/or until the grid clear signal 304 is removed.

While an example circuit topology of the low-voltage grid clear circuit 212 and the high-voltage grid clear circuit 214 are illustrated in FIG. 3, other circuit topologies may be used. For example, while a high voltage generator 316 is illustrated in FIG. 3, other high voltage generator circuits may additionally or alternatively be used. The example high voltage controller 314 may include logic circuits and/or other control circuitry. In some examples, the high voltage controller 314 is implemented in other logic in a platform that includes the ion propulsion system 200 of FIG. 2 (e.g., in a spacecraft).

Figure 4:
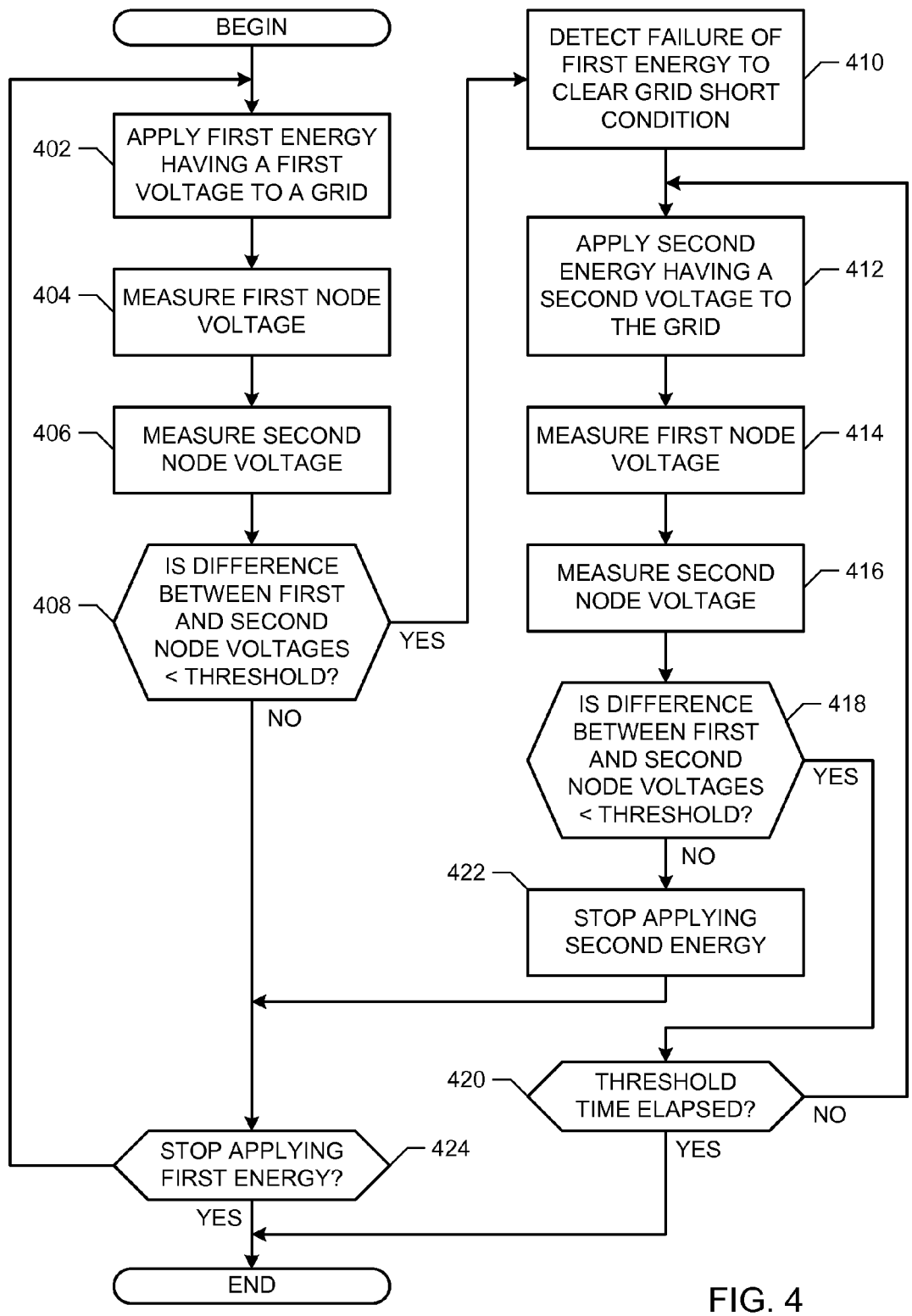
FIG. 4 is a flowchart illustrating an example method to clear a thruster grid short circuit condition.

FIG. 4 is a flowchart representative of an example method 400 to clear a short condition in a thruster grid. The example method 400 may be implemented using the low-voltage grid clear circuit 212 and the high-voltage grid clear circuit 214 of FIGS. 2 and 3. In some examples, the method 400 is invoked when a short circuit condition is detected in a thruster grid of an ion propulsion system such as the system 200 of FIG. 2.

The example method 400 of FIG. 4 begins by applying first energy having a first voltage (e.g., 100 V) to a grid (e.g., the grids 206, 210 of FIG. 3) (block 402). For example, the low-voltage grid clear circuit 212 may initiate a low-voltage grid clear process in response to a grid clear signal 304. The example high-voltage grid clear circuit 214 (e.g., via the high voltage controller 314) measures a first node voltage (block 404). The first node voltage may be measured, for example, at the node 320 or at the node 322. The high-voltage grid clear circuit 214 (e.g., via the high voltage controller 314) also measures a second node voltage (block 406). The second node voltage may be measured, for example, at the node 324 or the node 326 (e.g., the one of the nodes 324, 326 corresponding to (e.g., opposite) the node 320, 322 from which the first node voltage was measured).

The example high voltage controller 314 determines whether a difference between the first node voltage and the second node voltage is less than a threshold (block 408). If the difference is less than the threshold (block 408), the example high voltage controller 314 detects a failure of the first energy (e.g., from the low-voltage grid clear circuit 212) to clear the grid short condition (block 410). The high-voltage grid clear circuit 214 applies second energy having a second voltage to the grid(s) 206, 210 (block 412). For example, the high voltage controller 314 may close the switching element 318 to cause the high voltage generator 316 to begin applying the high voltage to the grid(s) 206, 210.

The example high-voltage grid clear circuit 214 (e.g., via the high voltage controller 314) measures the first node voltage (e.g., at the same node 320, 322 as the first node voltage was measured in block 404) (block 414). The high-voltage grid clear circuit 214 (e.g., via the high voltage controller 314) also measures the second node voltage (e.g., at the same node 324, 326 as the second node voltage was measured in block 406) (block 416). The example high voltage controller 314 determines whether a difference between the first node voltage and the second node voltage is less than a threshold (block 418). If the difference is less than the threshold (block 418), the example high voltage controller 314 determines whether a threshold time has elapsed (block 420). For example, the high-voltage grid clear process and/or the low-voltage grid clear process may be time-limited to avoid damaging the thruster grids 206-210. If the threshold time has not elapsed (block 420), control returns to block 412 to continue applying the second energy to the grid(s) 206, 210. If the difference between the first and second node voltages is not less than the threshold (block 418), the example high-voltage grid clear circuit 214 stops applying the second energy (block 422).

After stopping the second energy (block 422), or if the high voltage controller 314 determines at block 408 that the difference between the first and second node voltages is not less than the threshold, the example low-voltage grid clear circuit 212 determines whether to stop applying the first energy (block 424). For example, the low-voltage grid clear circuit 212 may detect the state or value of the grid clear signal 304. If the low-voltage grid clear circuit 212 is to continue applying the first energy (block 424), control returns to block 402. If the low-voltage grid clear circuit 212 stops applying the first energy (block 424) or if the threshold time has elapsed (block 420), the example method 400 ends. In an example in which the threshold time elapses prior to the high-voltage grid clear circuit 214 stopping the second energy, determining the threshold time has elapsed includes stopping both the first and second energies (e.g., via the grid clear signal 304).

Although an example method is described with reference to the flowchart illustrated in FIG. 4, many other methods of implementing the example ion propulsion system 200, the low-voltage grid clear circuit 212, and/or the high-voltage grid clear circuit 214 may alternatively be used. For example, the order of execution of the blocks may be changed, and/or some of the blocks described may be changed, eliminated, or combined.

Figure 5:
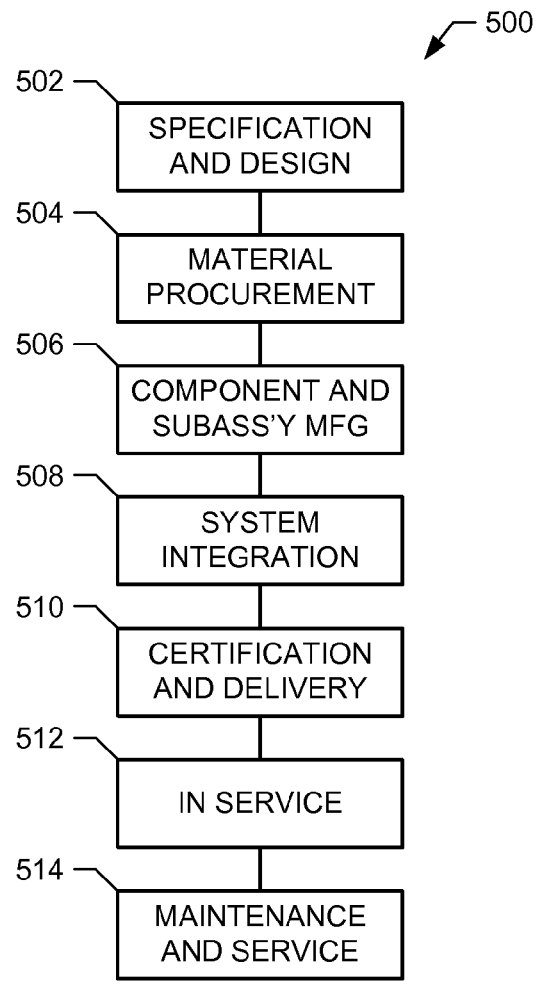
FIG. 5 is a flowchart of platform production and service methodology.
Figure 6:
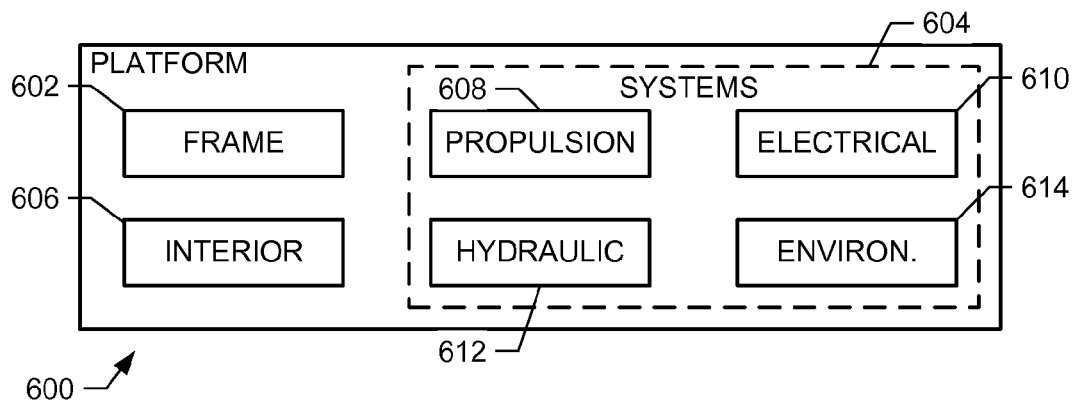
FIG. 6 is a block diagram of a platform.

Examples of the disclosure may be described in the context of a platform manufacturing and service method 500 as shown in FIG. 5 and a platform 600, such as spacecraft, as shown in FIG. 6. During pre-production, the example method 500 may include specification and design (block 502) of the platform 600 (e.g., a spacecraft), such as the placement(s) and/or design(s) of the example power supplies 202, the example thruster 204, the example low-voltage grid clear circuit 212, and/or the high-voltage grid clear circuit 214. Preproduction may further include material procurement (block 504). During production, component and subassembly manufacturing (block 506) and system integration (block 508) of the platform 600 (e.g., a spacecraft) takes place. During component and subassembly manufacturing (block 506) and/or system integration (block 508), the example power supplies 202, the example thruster 204, the example low-voltage grid clear circuit 212, and/or the high-voltage grid clear circuit 214 may be attached (e.g., affixed) to structural locations. Thereafter, the platform 600 (e.g., a spacecraft) may go through certification and delivery (block 510) in order to be placed in service (block 512). While in service by a customer, the platform 600 (e.g., a spacecraft) is scheduled for routine maintenance and service (block 514), which may also include modification, reconfiguration, refurbishment, etc.

Each of the operations of the example method 500 may be performed or carried out by a system integrator, a third party, and/or an operator (e.g., a customer). For the purposes of this description, a system integrator may include without limitation any number of platform (e.g., aircraft) manufacturers and major-system subcontractors; a third party may include without limitation any number of venders, subcontractors, and suppliers; and an operator may be an airline, leasing company, military entity, service organization, and so on.

As shown in FIG. 6, the platform 600 (e.g., spacecraft) produced by example method 500 may include a frame 602 with a plurality of systems 604 and an interior 606. Examples of high-level systems 604 include one or more of a propulsion system 608, an electrical system 610, a hydraulic system 612, and an environmental system 614. The example methods and apparatus disclosed herein may be integrated into the example systems 608-614 to provide clearing of grid short circuits. Any number of other systems may be included.

Apparatus and methods embodied herein may be employed during any one or more of the stages of the production and service method 500. For example, components or subassemblies corresponding to production process 506 may be fabricated or manufactured in a manner similar to components or subassemblies produced while the platform 600 (e.g., spacecraft) is in service 512. Also, one or more apparatus embodiments, method embodiments, or a combination thereof may be implemented during the production stages 506 and 508, for example, by substantially expediting assembly of or reducing the cost of a platform 600 (e.g., spacecraft). Similarly, one or more of apparatus embodiments, method embodiments, or a combination thereof may be utilized while the platform 600 (e.g., spacecraft) is in service 512, for example and without limitation, to maintenance and service 514.

Although certain example apparatus and methods have been described herein, the scope of coverage of this disclosure is not limited thereto. On the contrary, this disclosure covers all apparatus and methods fairly falling within the scope of the appended claims.

What is claimed is:

1. An apparatus, comprising:
    a low voltage grid clear circuit to apply first energy to an electric thruster grid at a first voltage; and
    a high voltage grid clear circuit to apply second energy to the electric thruster grid at a second voltage higher than the first voltage, wherein the high voltage grid clear circuit is to detect a short circuit condition in the electric thruster grid by:
    measuring a first node voltage in the low voltage grid clear circuit; and
    comparing the first node voltage to a threshold.

2. An apparatus as defined in claim 1, wherein the electric thruster grid comprises
    an ion propulsion system thruster grid.

3. An apparatus as defined in claim 1, wherein the high voltage grid clear circuit is to detect a failure of the first energy to clear the short circuit condition of the electric thruster grid by:
    measuring a second node voltage in the low voltage grid clear circuit at a different node than the first node voltage; and
    comparing a difference between the second node voltage and the first node voltage to another threshold, the high voltage grid clear circuit to apply the second energy in response to detecting the failure.

4. An apparatus, comprising:
    a low voltage grid clear circuit to apply first energy to an electric thruster grid at a first voltage; and
    a high voltage grid clear circuit to apply second energy to the electric thruster grid at a second voltage higher than the first voltage, wherein the high voltage grid clear circuit is to:
    detect that the low voltage grid clear circuit is applying the first energy to the electric thruster grid; and
    stop applying the second energy in response to detecting that the low voltage grid clear circuit is applying the first energy.

5. An apparatus as defined in claim 4, wherein the high voltage grid clear circuit is to detect that the low voltage grid clear circuit is applying the first energy by detecting a voltage drop in the low voltage grid clear circuit.

6. An apparatus as defined in claim 1, wherein the second voltage is to cause arcing between the electric thruster grid and a second electric thruster grid.

7. An apparatus as defined in claim 6, wherein the first energy at the first voltage is not sufficient to cause arcing between the electric thruster grid and the second electric thruster grid.

8. A method, comprising:
detecting a first grid clear process comprising application of a first voltage to an electric thruster grid wherein detecting the first grid clear process comprises measuring a first node voltage at a first node; and
applying a second grid clear process having a second voltage higher than the first voltage to the electric thruster grid;
measuring a second node voltage at a second node;
comparing a difference between the second node voltage and the first node voltage to a threshold; and
detecting a failure of the first grid clear process to clear a condition in the electric thruster grid based on the comparison, wherein applying the second grid clear process is in response to detecting the failure.

9. A method as defined in claim 8, wherein the second grid clear process comprises applying energy at the second voltage to the electric thruster grid to cause an electrical arc between the electric thruster grid and another grid.

10. A method as defined in claim 8, wherein the electric thruster grid comprises an ion propulsion system thruster grid.

11. A method, comprising:
detecting a first grid clear process comprising application of a first voltage to an electric thruster grid; and
applying a second grid clear process having a second voltage higher than the first voltage to the electric thruster grid;
while applying the second grid clear process, detecting a current being applied via the first grid clear process; and
stopping the second grid clear process in response to detecting the current.

12. A method as defined in claim 11, further comprising:
detecting that the current has stopped when the second grid clear process is stopped; and reapplying the second grid clear process.

13. A method, comprising:
detecting a first grid clear process comprising application of a first voltage to an electric thruster grid; and applying a second grid clear process having a second voltage higher than the first voltage to the electric thruster grid, wherein applying the second grid clear process is performed while applying the first grid clear process.

14. An ion propulsion system, comprising:
a first thruster grid;
a second thruster grid coupled to a reference voltage;
a low voltage grid clear circuit to clear a short circuit condition between the first thruster grid and the second thruster grid by applying first energy at a first voltage; and
a high voltage grid clear circuit to detect a failure of the first energy to clear the short circuit condition and to apply second energy to the grid at a second voltage higher than the first voltage in response to detection of the failure.

15. An ion propulsion system as defined in claim 14, wherein the high voltage grid clear circuit is to measure a first node voltage of the low voltage grid clear circuit to detect the short circuit condition.

16. An ion propulsion system as defined in claim 15, wherein the high voltage grid clear circuit is to measure a second node voltage of the low voltage grid clear circuit and compare the second node voltage to the first node voltage to detect the failure.

17. An ion propulsion system as defined in claim 16, wherein the high voltage grid clear circuit is to apply the second voltage to cause an arc between the first thruster grid and second thruster grid.

* * * * *